Oct. 8, 1946.  H. G. ROLLIN  2,408,884
CLUTCH ADJUSTING MECHANISM
Filed March 4, 1944  2 Sheets-Sheet 1

INVENTOR.
HARVEY G. ROLLIN

ATTORNEYS

Oct. 8, 1946.   H. G. ROLLIN   2,408,884
CLUTCH ADJUSTING MECHANISM
Filed March 4, 1944   2 Sheets-Sheet 2
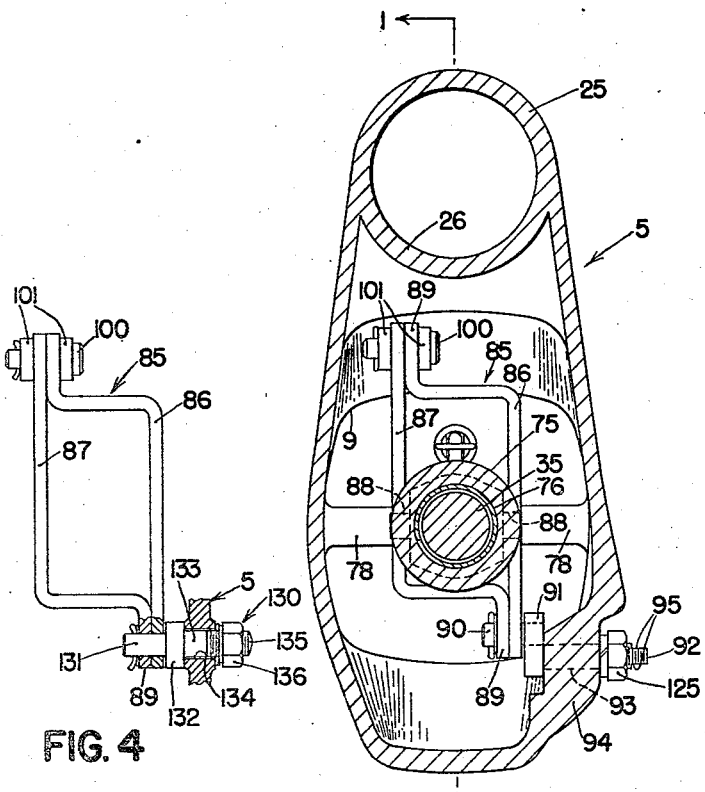
FIG. 2
FIG. 4
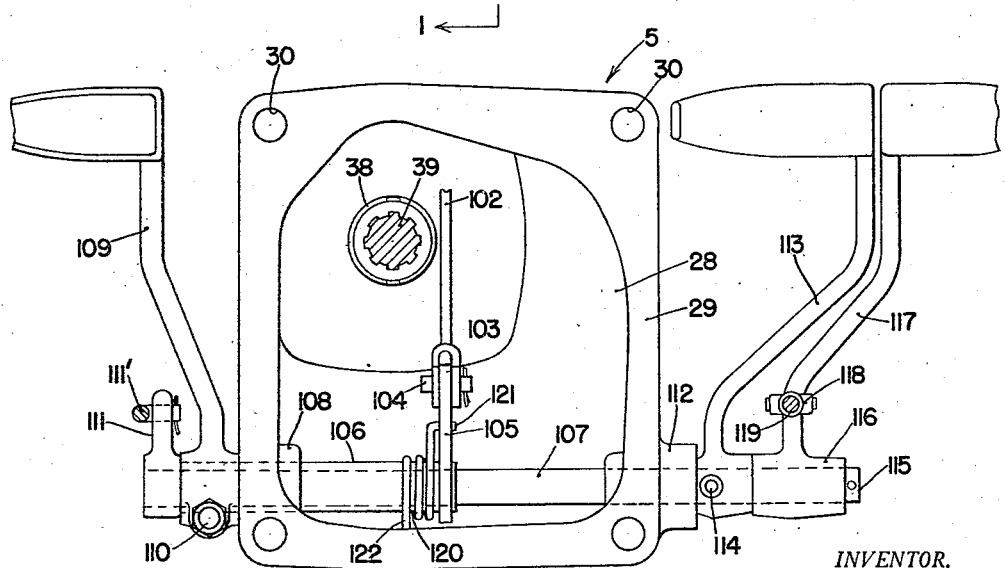
FIG. 3
INVENTOR.
HARVEY G. ROLLIN
ATTORNEYS Patented Oct. 8, 1946

2,408,884

UNITED STATES PATENT OFFICE 2,408,884

CLUTCH ADJUSTING MECHANISM

Harvey G. Rollin, Moline, Ill., assignor to Deere & Company, Moline, Ill., a corporation of Illinois Application March 4, 1944, Serial No. 525,084

8 Claims. (Cl. 192—111)

The present invention relates generally to clutches of the friction type used commonly in vehicle power transmission mechanism, and more particularly to devices for adjusting the connections between the clutch mechanism and the clutch control element such as the clutch pedal or lever, to compensate for progressive wear in the friction surfaces of the clutch.

The principal object of my invention relates to the provision of a clutch adjusting device that is simple, compact, inexpensive to manufacture, and yet is strong and durable in operation.

While my invention is adaptable to many different situations, it is believed that its advantages are most fully realized when applied to a certain type of tractor in which the frame connection between the front and rear wheels of the tractor consists simply of an elongated tubular housing connected between the engine block and the transmission gear housing and containing the clutch and the transmission shaft, which extends rearwardly from the clutch immediately behind the engine to the change gear mechanism within the transmission gear housing. Since in this type of vehicle, the operator's seat is positioned above and behind the rear axle housing, the clutch control pedal or lever is generally mounted at the rear end of this elongated tubular housing and must be connected with the clutch throwout mechanism by means of a connecting rod extending longitudinally of the tractor. Obviously, it is desirable to place this longitudinally extending control rod within the tubular housing to protect the connections and also to present a neater appearance, but when the connections are totally enclosed in this manner, it has heretofore been difficult to provide a take-up adjustment in the clutch control connections that is satisfactory and yet is accessible to provide quick and easy adjustment. Adjustment of the clutch pedal itself, while it can be made easily accessible, is not entirely satisfactory for the reason that the moments of the lever arms are progressively changed as the clutch faces become worn, resulting in some of the lever arms being shifted to undesirable angles outside of their normal range of operation.

A specific object of my invention, therefore, relates to the provision of a clutch take-up adjusting mechanism which avoids any of the difficulties expressed above, and that is easily accessible at all times. This object is accomplished, according to the principles of my invention, by mounting the throw-out fork of the clutch on a shiftable fulcrum support within the housing, which fulcrum support is shiftable by means of a control element extending outwardly through a wall of the clutch housing, and by means of which the throw-out fork and sleeve can be shifted axially of the clutch to compensate for wear and provide a take-up adjustment.

Still another object of the present invention relates to the provision of a simple but effective mounting for the clutch actuating pedal in conjunction with the right and left hand brake pedals.

These and other objects and advantages of my invention will be apparent to those skilled in the art after a consideration of the following description, in which reference is had to the drawings appended hereto, in which Figure 1 is a longitudinal sectional elevational view taken through a clutch and transmission housing embodying the principles of my invention, as represented by line 1—1 in Figure 2.

Figure 2 is a transverse sectional elevational view taken along a line 2—2 in Figure 1.

Figure 3 is a rear elevational view as represented by a line 3—3 in Figure 1.

Figure 4 is a sectional elevational view showing a modified form of my invention.

Figure 5 is a fragmentary side elevation showing the modified form of Figure 4.

Figure 1:
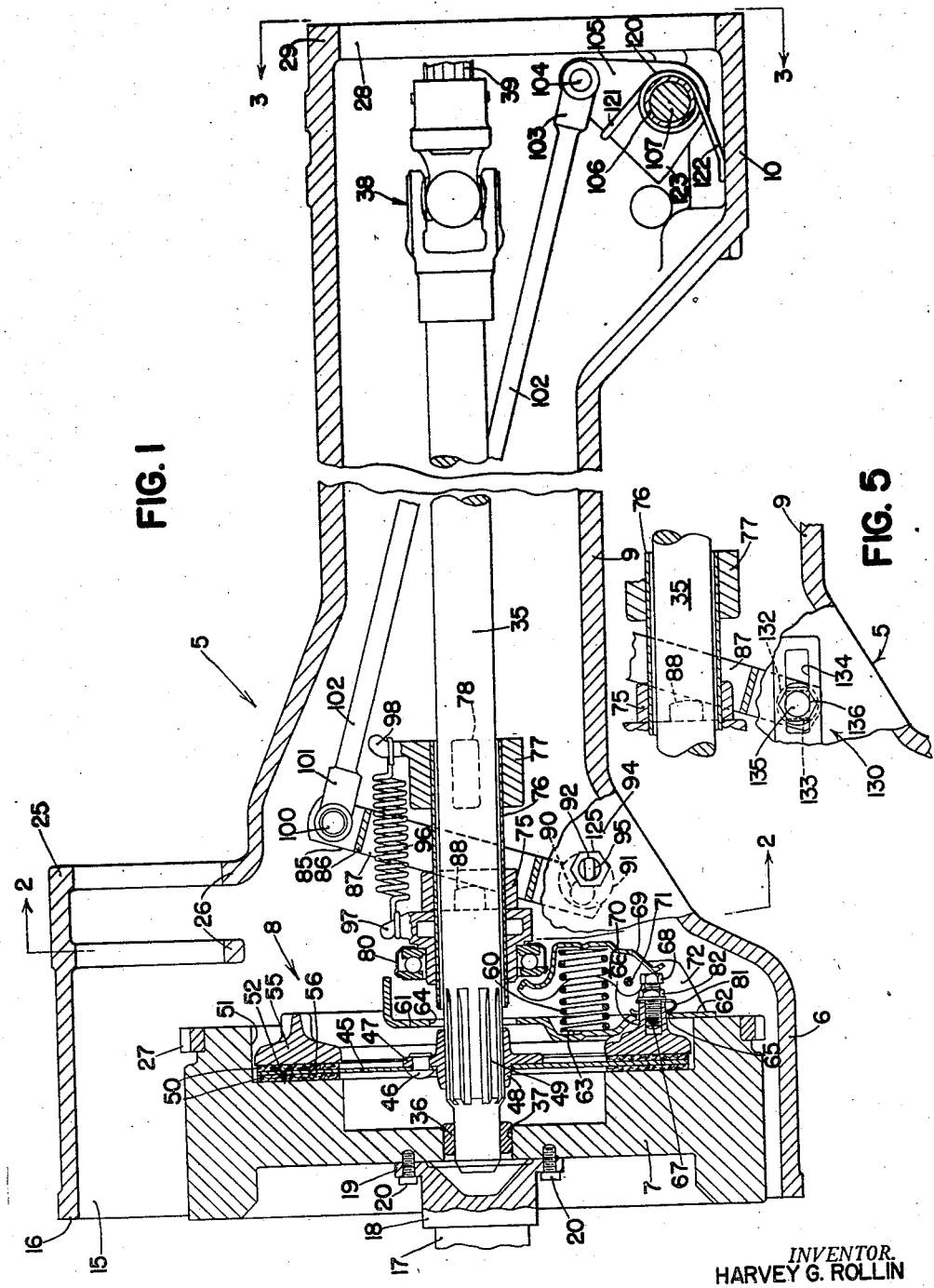

Referring now to the drawings, reference numeral 5 indicates in its entirety a housing, preferably of cast metal, having an enlarged portion 6 at the forward end providing a compartment for a flywheel 7 and clutch mechanism, indicated generally by reference numeral 8. The forward enlarged portion 6 is connected through a rearwardly extending tubular portion 9 of considerably smaller diameter, to a second enlarged portion 10 at the rear of the housing casting. The housing casting 5 is provided at its forward end with an opening 15, the peripheral edge 16 of the casting being adapted to be bolted rigidly to the rear of the engine block or housing (not shown). The crankshaft 17 of the engine is provided with a coupler 18 on its rear end, the coupler having a radially extending flange 19 which is rigidly secured to the flywheel 7 by bolts 20, which center the flywheel 7 for rotation about the axis of the crankshaft 17.

The upper part of the front portion 6 of the housing is extended upwardly to provide a housing support 25 for a starting motor (not shown), there being a pair of annular flanges 26 about the upper portion 25 adapted to receive the starting motor. A ring gear 27 is fixed to the periphery of the flywheel 7, adapted to mesh with the starting motor gear. However, since the starting motor and its connections form no part of the present invention, they are omitted in the interest of simplicity.

The rear end of the housing 5 is also provided with an opening 28 and a peripheral flange 29 adapted to be secured to the front side of the transmission housing (not shown) and is provided with holes 30 to receive the securing bolts.

The motor crankshaft 17 is connected with the transmission mechanism and traction wheels of the vehicle, by means of a transmission shaft 35, which extends longitudinally through the housing casting 5 and is journaled at its forward end in a suitable bearing 36 disposed within a central opening 37 in the flywheel 7. The rear end of the transmission shaft is connected through a universal joint 38 to a splined shaft 39, which is journaled in and extends forwardly from the transmission housing. Since none of the details of the transmission housing or mechanism form any part of the present invention, they are omitted in the interest of simplicity.

By means of the clutch mechanism 8, the flywheel 7 can be connected to the transmission shaft or disconnected therefrom at will. The clutch mechanism 8 includes a clutch disk 45, which is rigidly secured as by rivets 46 to a radially extending flange 47 on a splined hub 48. The hub 48 is mounted on a splined portion 49 of the transmission shaft 35. The clutch disk 45 is provided with annular facings 50 of suitable friction material which is well-known to those skilled in the art, the facings 50 extending around the periphery of the disk 45 on opposite faces thereof, respectively. The rear side of the flywheel 7 is provided with a cylindrical recess 51 to receive the clutch disk 45 and other parts of the clutch, and the inner radial surface 52 of the recess 51 serves as one of the frictional surfaces of the clutch and cooperates with the forward clutch surface 50 on the disk 45. The other clutch surface 50 coacts with an annular pressure plate 55, having a radially disposed surface 56. The pressure plate 55 is mounted on and rotates with the flywheel 7 and can be shifted axially toward and away from the clutch surface 52 on the flywheel, to grip therebetween the facings 50 on the clutch disk 45, and thus to transmit rotary power through the disk to the shaft 35.

As is well-known to those skilled in the art, the pressure for pressing the plate 55 against the clutch disk is obtained by means of a plurality of helical coil springs 60, which are supported on a back plate or spider 61 having a plurality of arms in angularly spaced relation, each provided with an attaching flange portion 62 by means of which the back plate or spider 61 is arranged to be secured to the back of the flywheel 7. Each of the arms 62 is provided with a recess 63 in which the associated coil spring 60 is seated. The spider 61 is provided with a central aperture 64, through which the transmission shaft 35 extends. Each arm 62 of the spider or back plate is provided with an aperture 65 spaced radially outwardly from the central axis, through each of which extends a lug 66 on the back of the annular pressure plate 55. Each of the lugs 66 is provided with a tapped recess 67 for receiving a set screw 68, the head of which is disposed in abutment with one end of a release lever 69. Each of the release levers 69 is channel-shaped, having side flanges 70, and the springs 60 are seated between the flanges 70 in the release levers 69. The levers 69 are pivotally mounted on the back plate 61 by means of pivot pins 71, which extend through perforations in the flanges 70 and are supported at opposite ends thereof in flanges 72 on the rear side of the back plate 61. Thus, each of the springs 60 reacts against the back plate 61 and is stressed in compression between the latter and the associated release lever 69, tending to force the latter in a clockwise direction, as viewed in Figure 1, about the pivot pin 71, to exert a pressure on the head of the set screw 68, thereby forcing the pressure plate 55 against the clutch disk 45, thereby gripping the latter between the pressure plate 55 and the clutch surface 52 on the flywheel 7. Further description of this arrangement is not considered necessary, inasmuch as the clutch shown and described herein is a conventional type well-known to those skilled in the art, and furthermore, my invention is not intended to be limited to any specific design of clutch.

Coming now to that part of the structure with which my invention is more closely concerned, the clutch is disengaged by means of a throwout sleeve 75, which is slidable axially upon a stationary tube 76, rigidly mounted within a hub 77. The hub 77 is rigidly fixed to the walls of the housing 5 by means of spokes 78. The hub 77 and the sleeve 76 are thus supported coaxially of the transmission shaft 35 which extends therethrough and is rotatable therewithin.

The throwout sleeve 75 is provided with an anti-friction type thrust bearing 80 extending peripherally around the inner end of the throwout sleeve and is adapted to be shifted axially with the latter into engagement with the inner ends of the several pivoted release levers 69. Thus, as viewed in Figure 1, when the sleeve 75 is shifted axially along the tube 76 to the left, the thrust bearing 80 engages the inner end of the release lever 69, and applying pressure in this direction tends to compress the spring 60 and pivot the release lever 69 in a counterclockwise direction about the pivot pin 71, thereby relieving the pressure against the set screw 68, and hence relieving pressure from the clutch surfaces.

A hairpin spring member 81 embraces each of the set screws 68 and is clamped between the end of the lug 66 and a lock nut 82, and bears against the back plate 61 to apply a force tending to shift the pressure plate 55 rearwardly away from the clutch disk 45 in order to relieve the friction between the latter and the pressure plate 55 and flywheel clutch surface 52. An initial adjustment of the set screws 68 is obtained with the lock nuts 82 loosened, to insure that the thrust bearing 80 engages the inner ends of the release levers 69 simultaneously when the sleeve 75 is shifted into engagement therewith, after which the lock nuts 82 are tightened to maintain the adjustment.

The throwout sleeve 75 is shifted by means of a bifurcated throwout lever or fork 85 comprising a pair of angularly bent strap members 86, 87, which fit together to form an open rectangle as best shown in Figure 2, the members 86, 87 defining a pair of vertical legs which straddle the supporting tube 76 and bear against a pair of trunnion lugs 88, rigidly fixed to opposite sides of the throwout sleeve 75, and preferably formed integrally therewith. Each of the strap members 86, 87 has an end portion 89 bent at right angles to lie in juxtaposition with the end of the leg of the other strap member. The lower ends of the juxtaposed members are pivotally mounted on a fulcrum pin 90, which is disposed substantially perpendicularly to the longitudinal vertical plane passing through the axis of the shaft 35. The pivot pin 90 is supported on a fulcrum support 91 in the form of a disk, which is rigidly mounted on a shaft 92 disposed substantially parallel to the pivot pin 90 and offset therefrom. The shaft 92 extends through a drilled aperture 93 in a thickened portion 94 of the housing wall and extends outwardly of the housing wall. The outer end of the shaft 92 is flattened as indicated at 95 to provide for gripping the end of the shaft by a wrench in order to turn the shaft 92 in the aperture 93. By virtue of the eccentric relation of the pivot pin 90 to the axis of the shaft 92, it will be evident that by rotating the latter, the pivot pin 90 can be shifted in an axial direction toward or away from the clutch mechanism. Assuming that the upper end of the throwout lever 85 is held stationary, it will be evident that adjusting the shaft 92 angularly will shift the throwout lever 85 toward the right, away from the trunnions 88 by turning the shaft 92 in a clockwise direction. Conversely, when the shaft 92 is turned in a counterclockwise direction, the lower end of the lever 85 is shifted toward the left, thereby adjusting the sleeve 75 closer to the ends of the release levers 69. The trunnions 88 are maintained in contact with the lever 85 by means of a tension spring 96, connected between a pair of horns 97, 98, formed integrally with the sleeve 75 and hub 77, respectively.

The upper ends of the strap members 86, 87 are interconnected by a pivot pin 100, to which is also connected a bifurcated clevis 101, fixed to a connecting rod 102 extending rearwardly through the tubular housing 9 offset at one side of the transmission shaft 35. The rear end of the connecting rod 102 is fixed to a clevis 103, pivotally connected by a pin 104 to an arm 105, which is rigidly fixed to a sleeve 106. The sleeve 106 is journaled on a shaft 107 and extends laterally through a suitable opening in the housing portion 10, a bearing 108 being provided in which the sleeve 106 is journaled. A clutch actuating lever in the form of a pedal 109, is rigidly clamped by means of a clamping bolt 110 to the outer end of the sleeve 106 on the outside of the housing 5. The shaft 107 extends through the sleeve and beyond the outer end of the latter and is provided with an arm 111 fixed to the outer end thereof, which is adapted to be connected by a suitable tension member 111' with the brake on the left rear axle of the tractor. The shaft 107 extends through a bearing 112 in the opposite side wall of the housing 5, and is actuated by means of a brake pedal 113, which is fixed to the shaft 107 by means of a set screw 114. The brake shaft 107 is extended outwardly beyond the brake pedal 113, as indicated at 115, and rotatably supports the hub 116 of a second brake pedal 117, to which is pivotally connected a clevis 118 attached to a tension rod 119 extending rearwardly to the right of the traction wheel brake.

A coil spring 120 encircles the sleeve 106 and has one end 121 hooked over the arm 105, the opposite end 122 being disposed in engagement with the lower wall of the housing portion 10. The purpose of the spring 120 is to retract the clutch pedal 109 when the operator relieves pressure therefrom.

During operation, the clutch springs 60 normally force the release levers 69 into engagement with the set screws 68 in the pressure plate 55, forcing the latter into contact with the clutch disk 45. Thus, during normal operation, the crankshaft 17, flywheel 7, clutch disk 45, pressure plate 55, and transmission shaft 35, all rotate in unison about a common axis. At this time, the spring 96 retains the throwout sleeve 75 in retracted position out of engagement with the inner ends of the release levers 69, therefore the anti-friction bearing 80 is stationary. The clutch can be disengaged by pressing forwardly upon the clutch pedal 109, thereby rotating the sleeve 106 in a counterclockwise direction as viewed in Figure 1, swinging the arm 105 forwardly, thereby exerting a forwardly acting force through the connecting rod 102 to the pivot pin 100 at the upper end of the fork 85, thereby pushing the latter forwardly about the pivot pin 90 and exerting a pressure against the trunnions 88, forcing the sleeve 75 forwardly with the anti-friction thrust bearing 80 in contact with the inner ends of the release levers 69, thereby lifting the outer ends of the release levers 69 away from the set screws 68 against the force of the springs 60. The hairpin springs 81 then relieve the frictional contact between the pressure plate 55 and the disk 45 and prevent the pressure plate from rattling. When pressure is released from the clutch pedal 109, the spring 120 returns the pedal to normal position and the spring 96 retracts the throwout sleeve 75 as before. The forward movement of the clutch pedal 109 is limited by the front corner 123 of the arm 105 engaging the bottom of the housing section 10. The arm 105 is in the form of a flat plate fixed, as by welding, to the inner end of the sleeve 106.

By pressing forwardly on the left brake pedal 113, the brake shaft 107 is rotated in a counterclockwise direction as viewed in Figure 1, moving the arm 111 forwardly and exerting a tensional force through the connecting rod 111' to apply the left wheel brake. The right wheel brake is applied by pressing forwardly on the right brake pedal 117, which rotates on the shaft 107 and exerts a tensional force through the connecting rod 119 to apply the right brake. Both rear wheel brakes can be applied by the operator placing his foot over both pedals 113, 117, which are disposed close together for this purpose.

As the clutch facings 50 wear down, it is obvious that the pressure plate 55 will gradually move forwardly, the springs 60 gradually shifting the release levers 69 about their pivot pins 71 so that the inner ends of the release levers are progressively moved rearwardly relative to the shaft 35. It will be noted that a small clearance between the inner ends of the release levers 69 and the thrust bearing 80 is provided so that the latter does not rotate during normal operation, but after considerable wear has taken place on the clutch facings 50, the inner ends of the release levers will sooner or later engage the forward race of the ball bearing 80, causing the latter to spin during normal operation. When this occurs, the throwout sleeve 75 can easily be adjusted rearwardly to bring the bearing 80 out of contact with the release levers 69, by engaging the flat sides 95 of the shaft 92 with a wrench and turning it slightly in a clockwise direction, thereby shifting the fork 85 toward the right and allowing the spring 96 to retract the sleeve 75. The adjusting shaft 92 is secured in any position of adjustment by means of a lock nut 125 which engages the outer end of the shaft 92, the latter being threaded to receive the nut, which can be tightened against the outer side of the casing 5 to hold the shaft 92 against rotation.

Obviously, another take-up adjustment is provided by the set screws 68, for instead of adjusting the shaft 92, to shift the thrust bearing 80 rearwardly away from the inner ends of the release levers 69, the set screws 68 could be backed rearwardly out of the threaded sockets 67, to adjust the release levers in a counterclockwise direction about the pivot pins 71. This would be a difficult operation, however, since the set screws 68 are not easily accessible, and furthermore it would be necessary to take care that the set screws were shifted equal amounts in order to maintain equalized pressure against the thrust bearing 80. Thus, the single adjustment provided by the shaft 92 provides an extremely simple method of adjusting the take-up in the clutch mechanism.

In the modified form shown in Figures 4 and 5, the throwout fork 85 is pivotally mounted on a shiftable fulcrum member 130, comprising a pivot portion 131, on which the lower ends of the fork 85 are swingably mounted, an enlarged collar portion 132 adapted to bear against the inner side of the housing 5, a shank portion 133 of rectangular cross section extending outwardly through a generally horizontal slot 134 in the wall of the housing 5, and a cylindrical threaded outer end portion 135 projecting outwardly of the slot 134. A nut 136 engages the threaded portion and can be tightened against the housing wall to rigidly secure the fulcrum member 130 in position.

The member 130 can be shifted fore or aft within the slot 134, after the nut has been loosened, to adjust the fulcrum of the fork 85 toward or away from the clutch mechanism, as described in connection with the embodiment of Figures 1 and 2. When the nut 136 is tightened to secure the member 130 in adjusted position, the rectangular shank 133 prevents the member 130 from turning.

I do not intend my invention to be limited to the exact details shown and described herein, except as set forth in the claims which follow.

I claim:

1. In a power transmission device including a housing and a releasable clutch, a transmission shaft connected thereto, and a throwout member for said clutch disposed within said housing, and an actuating rockshaft journaled in said housing spaced from said throwout member, the combination of a throwout lever disposed in said housing for actuating said member, a connecting rod extending within said housing between said rockshaft and said lever, a fulcrum support on which said lever is pivoted, means for pivotally mounting said fulcrum support within said housing including a shaft fixed to said support eccentrically relative to the pivot axis of said lever, said shaft being journaled in an aperture in a wall of said housing and extending outwardly through said housing wall, and means for fixing said shaft to said housing wall in angularly adjusted position.

2. In a power transmission device including a housing and a releasable clutch, a transmission shaft connected thereto, and a throwout sleeve for said clutch disposed coaxial with said shaft within said housing, the combination of a throwout fork comprising a pair of bars disposed on opposite sides of said shaft and engaging said throwout sleeve for actuating the latter, an adjustable mounting means for said fork in said housing, comprising a fulcrum support on which said lever is pivoted providing for swinging movement relative to said transmission shaft in an axial direction, an adjusting shaft on which said fulcrum support is rigidly mounted, the axis of said adjusting shaft being parallel to the pivot axis of said lever and offset therefrom, said shaft being journaled in an aperture in a wall of said housing and extending outwardly through said housing wall, and means for fixing said shaft to said housing wall in angularly adjusted position.

3. In a power transmission device including a housing and a releasable clutch, a transmission shaft connected thereto, and a throwout member for said clutch disposed within said housing, the combination of a throwout lever disposed in said housing for actuating said member, and a fulcrum support on which said lever is pivoted, said housing having a slot in a wall thereof through which said fulcrum support extends and is shiftable in said slot to adjust said throwout lever, and means accessible from outside said housing for securing said fulcrum support in adjusted position.

4. In a power transmission device including a housing and a releasable clutch, a transmission shaft connected thereto, and a throwout member for said clutch disposed within said housing, the combination of a throwout lever disposed in said housing for actuating said member, and a fulcrum support on which said lever is pivoted, said housing having a slot in a wall thereof through which said fulcrum support extends and is shiftable in said slot toward and away from said clutch mechanism to adjust said throwout lever, said fulcrum support having a shank portion of rectangular cross section slidably engaging the sides of said slot to prevent rotation of said support therein and a threaded end portion outside said housing, and a securing nut engaging said threaded end of the fulcrum support.

5. In a power transmission device including a housing and a releasable clutch, a transmission shaft connected thereto and extending axially, a throwout member for said clutch disposed within said housing, a lever for actuating said member, an elongated transmission shaft housing enclosing said shaft and having a chamber at its end remote from said clutch, a rockshaft journaled in said chamber, an arm on said rockshaft, a connecting rod pivotally connected to said arm and extending through said shaft housing alongside said transmission shaft and connected at its opposite end to said throwout lever, an adjustable mounting means for said lever in said housing and means extending through a wall of said housing for adjusting said mounting means to provide a take-up adjustment for said clutch.

6. In a power transmission device including a housing and a releasable clutch, a transmission shaft connected thereto and extending axially, a throwout member for said clutch disposed within said housing, a lever for actuating said member, an elongated transmission shaft housing enclosing said shaft and having a chamber at its end remote from said clutch, a rockshaft journaled in said chamber, an arm on said rockshaft, a connecting rod pivotally connected to said arm and extending through said shaft housing alongside said transmission shaft and connected at its opposite end to said throwout lever, a fulcrum support in said clutch housing on which said lever is pivoted, and means for pivotally mounting said fulcrum support within said housing for movement about an axis eccentric of and parallel to the pivot axis of said lever, said pivot mounting including a part extending through a wall of said 7. In a power transmission device including a releasable clutch, a transmission shaft connected thereto and extending axially therefrom, a clutch housing in which the clutch is mounted, a long tubular enclosure of restricted diameter for said transmission shaft connected in communication with said clutch housing, an enlarged housing chamber at the remote end of said transmission shaft, a rockshaft journaled in said chamber and extending outwardly thereof, a clutch operating lever mounted on the outer end of said rockshaft, a throwout member disposed in said clutch housing and associated with said clutch for controlling the latter, a throwout fork for actuating said member, a connecting rod pivotally connected with said fork and extending through said shaft housing alongside said transmission shaft, an arm mounted on said rockshaft within said chamber and pivotally connected to the opposite end of the connecting rod, an adjustable mounting means for said throwout fork in said housing, and means extending through a wall of said housing for adjusting said mounting means to provide a take-up adjustment for said clutch.

8. In a power transmission device including a releasable clutch, a transmission shaft connected thereto and extending axially therefrom, a clutch housing in which the clutch is mounted, a long tubular enclosure of restricted diameter for said transmission shaft connected in communication with said clutch housing, an enlarged housing chamber at the remote end of said transmission shaft, a rockshaft journaled in said chamber and extending outwardly thereof, a clutch operating lever mounted on the outer end of said rockshaft, a throwout member disposed in said clutch housing and associated with said clutch for controlling the latter, a throwout fork for actuating said member, a connecting rod pivotally connected with said fork and extending through said shaft housing alongside said transmission shaft, an arm mounted on said rockshaft within said chamber and pivotally connected to the opposite end of the connecting rod, an adjustable mounting means for said throwout fork in said housing comprising a fulcrum support in said housing on which said fork is pivoted, and means for pivotally mounting said fulcrum support for movement about an axis eccentric of and parallel to the pivot axis of said fork, said pivot mounting including a part extending through a wall of said housing to permit adjustment of said fulcrum support from outside the housing.

HARVEY G. ROLLIN